United States Patent
Park et al.

(10) Patent No.: US 12,074,312 B2
(45) Date of Patent: Aug. 27, 2024

(54) NEGATIVE ELECTRODE FOR LITHIUM SECONDARY BATTERY AND METHOD OF MANUFACTURING THE SAME

(71) Applicant: SK On Co., Ltd., Seoul (KR)

(72) Inventors: Eun Jun Park, Daejeon (KR); Gwi Ok Park, Daejeon (KR); Hyo Shik Kil, Daejeon (KR); In Ae Lee, Daejeon (KR)

(73) Assignee: SK ON CO., LTD., Seoul (KR)

( * ) Notice: Subject to any disclaimer, the term of this patent is extended or adjusted under 35 U.S.C. 154(b) by 4 days.

(21) Appl. No.: 18/338,348

(22) Filed: Jun. 21, 2023

(65) Prior Publication Data

US 2023/0420642 A1    Dec. 28, 2023

(30) Foreign Application Priority Data

Jun. 23, 2022  (KR) .................. 10-2022-0076674

(51) Int. Cl.
| | |
|---|---|
| H01M 4/134 | (2010.01) |
| H01M 4/139 | (2010.01) |
| H01M 10/052 | (2010.01) |
| B82Y 30/00 | (2011.01) |
| H01M 4/02 | (2006.01) |

(52) U.S. Cl.
CPC .......... *H01M 4/134* (2013.01); *H01M 4/139* (2013.01); *H01M 10/052* (2013.01); *B82Y 30/00* (2013.01); *H01M 2004/027* (2013.01)

(58) Field of Classification Search
CPC .... H01M 4/134; H01M 4/139; H01M 10/052; H01M 2004/027; B82Y 30/00
See application file for complete search history.

(56) References Cited

U.S. PATENT DOCUMENTS

| | | | |
|---|---|---|---|
| 9,269,954 B2 * | 2/2016 | Kojima .................. | C01B 33/32 |
| 2006/0147369 A1 * | 7/2006 | Bi ......................... | B01J 19/121 |
| | | | 428/688 |
| 2012/0066926 A1 * | 3/2012 | Prabhakaran ......... | B82Y 30/00 |
| | | | 34/386 |
| 2013/0309574 A1 * | 11/2013 | Fukuoka ............... | H01M 4/134 |
| | | | 361/523 |
| 2016/0172671 A1 * | 6/2016 | Yoo ....................... | H01M 4/485 |
| | | | 429/231 |
| 2018/0198155 A1 * | 7/2018 | Park ...................... | H01M 10/052 |

FOREIGN PATENT DOCUMENTS

| | | | |
|---|---|---|---|
| JP | 2014-086254 A | | 5/2014 |
| JP | 2016-225199 A | | 12/2016 |
| JP | 2018-049811 A | | 3/2018 |
| JP | 6548959 B2 | | 7/2019 |
| KR | 10-2014-0051783 A | | 5/2014 |
| KR | 10-2016-0113842 A | | 10/2016 |
| KR | 10-2018-0014710 A | | 2/2018 |
| KR | 10-2018-0103507 A | | 9/2018 |
| KR | 10-2019-0071301 A | | 6/2019 |
| KR | 10-2020-0049494 A | | 5/2020 |
| KR | 10-2020-0102525 A | | 8/2020 |
| KR | 10-2285149 B1 | | 8/2021 |
| WO | WO 2015157538 | * | 10/2015 |
| WO | 2016194288 A1 | | 12/2016 |
| WO | 2019053982 A1 | | 3/2019 |
| WO | WO 2019055897 | * | 3/2019 |
| WO | WO 2022084545 | * | 4/2022 |

OTHER PUBLICATIONS

Decision to grant a patent published by KPO for Application No. KR.20220076674 (Year: 2023).*
Extended European Search Report for the European Patent Application No. 23181026.8 issued by the European Patent Office on Nov. 17, 2023.
Sommerfeld Marcus et al: "A Combined Pyro- and Hydrometallurgical Approach to Recycle Pyrolyzed Lithium-Ion Battery Black Mass Part 1 : Production of Lithium Concentrates in an Electric Arc Furnace", Metals, vol. 10, No. 8, Aug. 7, 2020 (Aug. 7, 2020), p. 1069, XP055910680, DOI: 10.3390/met10081069.

* cited by examiner

*Primary Examiner* — Alexander Usyatinsky
(74) *Attorney, Agent, or Firm* — IP & T GROUP LLP

(57) ABSTRACT

Provided are a negative electrode for a lithium secondary battery and a method of manufacturing the same. The negative electrode for a lithium secondary battery according to an embodiment of the present invention includes a silicon-based negative electrode active material including iron and aluminum, wherein in ICP analysis of a negative electrode active material layer including the silicon-based negative electrode active material, contents of elements in the negative electrode active material layer satisfy the following Relations (1) to (3):

$$A/(B^2+C^2) \leq 4{,}500 \qquad (1)$$

$$5 \leq B \leq 1{,}500 \qquad (2)$$

$$3 \leq C \leq 1{,}000 \qquad (3)$$

wherein A is a Li content in ppm, B is an Fe content in ppm, and C is an Al content in ppm, based on the total weight of the ICP-analyzed negative electrode active material layer.

9 Claims, No Drawings

NEGATIVE ELECTRODE FOR LITHIUM SECONDARY BATTERY AND METHOD OF MANUFACTURING THE SAME

CROSS-REFERENCE TO RELATED APPLICATIONS

This application claims priority under 35 U.S.C. § 119 to Korean Patent Application No. 10-2022-0076674, filed on Jun. 23, 2022, in the Korean Intellectual Property Office, the disclosure of which is incorporated herein by reference in its entirety.

TECHNICAL FIELD

The following disclosure relates to a negative electrode for a lithium secondary battery and a method of manufacturing the same.

BACKGROUND

In recent years, demand for environmentally friendly technologies for solving the global warming problem is rapidly increasing. In particular, as demand for electric vehicles and energy storage systems (ESS) increases, demand for lithium secondary batteries also is exploding.

Generally, a conventional lithium secondary battery may use a carbon (C)-based negative electrode material such as natural graphite and artificial graphite, however, the energy density of a battery using graphite is low due to the low theoretical capacity of graphite of 372 mAh/g. Therefore, studies on a new negative electrode material for improving the low energy density are in progress.

As a solution for solving energy density, a silicon (Si)-based negative electrode material having a high theoretical capacity of 3580 mAh/g is on the rise. However, the silicon-based negative electrode material has poor battery life characteristics due to a large volume expansion (~400%) in the process of repeated charging and discharging. In addition, since a silicon-based negative electrode material lacks thermal stability, further improvements are needed.

SUMMARY

An embodiment of the present invention is directed to a silicon-based negative electrode material exhibiting improving life characteristics and thermal stability of a silicon-based negative electrode material.

According to an aspect of the present invention, a negative electrode for a lithium secondary battery includes a silicon-based negative electrode active material including iron and aluminum, wherein in ICP (Inductively Coupled Plasma) spectroscopy analysis of a negative electrode active material layer including the silicon-based negative electrode active material, contents of elements in the negative electrode active material layer satisfy the following Relations (1) to (3):

$$A/(B^2+C^2) \leq 4{,}500 \tag{1}$$

$$5 \leq B \leq 1{,}500 \tag{2}$$

$$2.5 \leq C \leq 1{,}000 \tag{3}$$

wherein A is a Li content in ppm, B is an Fe content in ppm, and C is an Al content in ppm, based on the total weight of the ICP-analyzed negative electrode active material layer.

In addition, according to an embodiment of the present invention, in Relation (1), "$A/(B^2+C^2) \leq 1{,}000$" may be satisfied.

In addition, according to an embodiment of the present invention, in Relation (1), "$5{,}000 \leq A \leq 150{,}000$" may be satisfied.

In addition, according to an embodiment of the present invention, in the ICP analysis of the negative electrode active material layer, the contents of elements in the negative electrode active material layer may further satisfy the following Relation (4):

$$100 \leq B+C \tag{4}$$

wherein B is an Fe content in ppm, and C is an Al content in ppm, based on the total weight of the ICP-analyzed negative electrode active material layer.

In addition, the negative electrode for a lithium secondary battery according to an embodiment of the present invention may further include artificial graphite.

In addition, the negative electrode for a lithium secondary battery according to an embodiment of the present invention may further include single-walled carbon nanotubes.

In addition, according to an embodiment of the present invention, the silicon-based negative electrode active material may further include lithium.

In addition, according to an embodiment of the present invention, the silicon-based negative electrode active material may include a lithium silicate represented by the following Chemical Formula 1:

$$Li_xSi_yO_z \qquad \text{[Chemical Formula 1]}$$

wherein $1 \leq x \leq 6$, $1 \leq y \leq 4$, and $0 < z \leq 7$.

According to another aspect of the present invention, a method of manufacturing a negative electrode for a lithium secondary battery includes: a) stirring a solution or dispersion including a silicon-based material, an iron precursor, and an aluminum precursor; and b) heat treating the product of the process a), thereby preparing a negative electrode active material co-doped with iron and aluminum.

In addition, according to an embodiment of the present invention, the process a) may be the stirring of the solution or dispersion including the silicon-based material, the iron precursor, and the aluminum precursor so that an Fe/Si molar ratio is more than 0 and 0.07 or less and an Al/Si molar ratio is more than 0 and 0.08 or less.

In addition, according to an embodiment of the present invention, in the process a), a stirring speed may be 100 to 3000 rpm.

In addition, according to an embodiment of the present invention, in the process a), a temperature during the stirring may be 15 to 80° C.

In addition, according to an embodiment of the present invention, in the process a), the stirring may be performed by further including a lithium precursor.

In addition, according to an embodiment of the present invention, the silicon-based material of the process a) may be prepared by a pre-lithiation process of mixing the silicon-based material and the lithium precursor and then performing a heat treatment to dope the silicon-based material with lithium.

In addition, according to an embodiment of the present invention, the heat heating of the process b) may be performed at 200 to 1000° C.

In addition, according to an embodiment of the present invention, the iron precursor may include one of an Fe metal; an Fe oxide; an Fe compound or Fe oxide containing one or more of Cl, N, P, and H; and an Fe composite oxide containing one or more metals of Li, Ti, V, Cr, Mn, Co, and Ni; or a combination thereof.

In addition, according to an embodiment of the present invention, the alumina precursor may include one of an Al metal; an Al oxide; an Al compound or Al oxide containing one or more of Cl, N, P, and H; and an Al composite oxide containing one or more metals of Li, Ti, V, Cr, Mn, Co, Fe, and Ni; or a combination thereof.

In addition, according to an embodiment of the present invention, the silicon-based material may include one of Si, $SiO_x$ (0<x≤2), a Si-containing alloy, and a Si/C composite, or a combination thereof.

In still another general aspect, a lithium secondary battery includes the negative electrode according to one exemplary embodiment of the exemplary embodiments described above.

Other features and aspects will be apparent from the following detailed description, the drawings, and the claims.

DETAILED DESCRIPTION OF EMBODIMENTS

Advantages and features of the present invention and methods to achieve them will become apparent from the following embodiments described in detail with reference to the accompanying drawings. However, the present invention may not be limited to the embodiments disclosed below, but will be implemented in various forms. The embodiments of the present invention make the disclosure of the present invention thorough and are provided so that those skilled in the art can easily understand the scope of the present invention. Therefore, the present invention will be defined by the scope of the appended claims. Detailed description for carrying out the present invention will be provided with reference to the accompanying drawings below. Regardless of the drawings, the same reference number indicates the same constitutional element, and "and/or" includes each of and all combinations of one or more of mentioned items.

Unless otherwise defined herein, all terms used in the specification (including technical and scientific terms) may have the meaning that is commonly understood by those skilled in the art. Throughout the present specification, unless explicitly described to the contrary, "comprising" any elements will be understood to imply further inclusion of other elements rather than the exclusion of any other elements. In addition, unless explicitly described to the contrary, a singular form includes a plural form herein.

In the present specification, it will be understood that when an element such as a layer, film, region, or substrate is referred to as being "on" or "above" another element, it can be directly on the other element or intervening elements may also be present.

According to the present invention, the thermal stability of a material may be improved by aluminum doping to improve a capacity retention rate at a high temperature, the kinetic properties of lithium ions may be improved by iron doping, and structural defects of a silicon-based negative electrode material may be compensated and a uniform voltage distribution on the surface of a negative electrode material may be secured by co-doping iron and aluminum. Thus, according to the present invention, significantly improved life characteristics and thermal stability of a battery may be secured.

According to an embodiment of the present invention, a negative electrode for a lithium secondary battery including a silicon-based negative electrode active material including iron and aluminum, wherein in ICP analysis of a negative electrode active material layer including the silicon-based negative electrode active material, contents of elements in the negative electrode active material layer satisfy Relations (1) to (3), may be provided:

$$A/(B^2+C^2) \leq 4{,}500 \tag{1}$$

$$5 \leq B \leq 1{,}500 \tag{2}$$

$$2.5 \leq C \leq 1{,}000 \tag{3}$$

wherein A is a Li content in ppm, B is an Fe content in ppm, and C is an Al content in ppm, based on the total weight of the ICP-analyzed negative electrode active material layer.

According to an embodiment, in the ICP analysis of the negative electrode active material layer, a negative electrode to be analyzed, a lithium metal as a counter electrode, and a polyethylene (PE) separator between the negative electrode and the counter electrode are disposed, and an electrolyte solution is injected to manufacture a CR2016 type coin cell. Here, the electrolyte solution injected into the coin cell may be obtained by mixing 1.0 M $LiPF_6$ as a lithium salt with an organic solvent (EC:EMC=30:70 vol %) and mixing 2 to 5 vol % of FEC as an electrolyte additive therewith. The half battery manufactured is charged at a constant current at room temperature (25° C.) until the voltage reached 0.01 V (vs. Li/Li$^+$) at a current of 0.1 C rate, and then is charged with a constant voltage by cut-off at a current of 0.01 C rate while maintaining 0.01 V in a constant voltage mode. The battery is discharged at a constant current of 0.1 C rate until the voltage reached 1.5 V (vs. Li/Li$^+$). One charge and discharge cycle is performed under the charge and discharge conditions, and then disassembly is performed to obtain a negative electrode. Next, the disassembled negative electrode is washed several times with an organic solvent such as dimethyl carbonate (DMC), and negative electrode active material layer powder was recovered by scrapping off the powder so that a current collector is not included.

A method of measuring the Li content (A), the Fe content (B), and the Al content (C) using the negative electrode active material layer powder recovered above may be the following:

[1] adding 0.01 to 0.05 g of the recovered negative electrode active material layer powder to a 50 mL polypropylene (PP) tube;

[2] adding a nitric acid to the PP tube and then adding a hydrofluoric acid thereto until brown fume does not occur;

[3] heating the PP tube with a heating block and drying the tube to remove a hydrofluoric component;

[4] adding a nitric acid and hydrogen peroxide to the PP tube and then heating the PP tube with a heating block for redissolving;

[5] cooling the resulting product to room temperature, diluting it with ultrapure water, and filtering it for removing insoluble components to prepare a sample; and

[6] performing ICP analysis on the prepared sample to measure the Li content (A), the Fe content (B), and the Al content (C) (A, B, and C are the weights (ppm) of Li, Fe, and Al included based on the total weight of the negative electrode active material layer (powder) to be measured, respectively).

Here, the ICP analysis may be performed using Optima 8300DV available from Perkin Elmer.

ICP analysis results may be the contents (ppm) of Li, Fe, and Al derived based on the total weight of the ICP analyzed negative electrode active material layer (powder).

The negative electrode to be analyzed may be a freshly manufactured electrode, and may be obtained by disassembling a finished battery or a battery purchased on the market. The finished battery or the battery purchased on the market may be previously subjected to 5 cycles or less of charging and discharging during the manufacturing process of the battery, for example, a formation process or the like. However, since a change in the resulting value of the ICP analysis of the negative electrode is very small by performing 5 cycles or less of charge and discharge, the negative electrode obtained by disassembling a finished battery or a battery purchased on the market is manufactured into a half battery under the same conditions as described above, the half battery is discharged to 1.5 V (vs. Li/Li$^+$), the negative electrode is disassembled, and ICP analysis may be performed on the disassembled negative electrode by the same method as described above.

According to the present invention, the ICP analysis of the negative electrode active material layer according to an embodiment described above is performed, thereby quantitatively showing the contribution of iron and aluminum which are co-doped into the silicon-based negative electrode material to life characteristics and thermal stability.

Hereinafter, the reasons for defining Relations (1) to (3) will be described, respectively.

Relation (1) is a parameter for compensating for structural defects of a silicon-based negative electrode material and securing a uniform voltage distribution on the surface of the negative electrode material by co-doping iron and aluminum, thereby securing improved life characteristics and thermal stability of a battery. The resulting value of Relation (1) may be derived by substituting the measured numerical values of the Li content in ppm, the Fe content in ppm, and Al content in ppm without a unit into Relation (1).

When the value is more than the upper limit of 4,500 of Relation (1), the contents of iron and aluminum doped are too small as compared with the content of lithium, and thus, sufficient life characteristics and thermal stability may not be secured. From the point of view of further improving the life characteristics and the thermal stability by co-doping of iron and aluminum, according to a preferred exemplary embodiment, Relation (1) may be $A/(B^2+C^2) \leq 4,000$, $A/(B^2+C^2) \leq 3,000$, $A/(B^2+C^2) \leq 2,000$, $A/(B^2+C^2) \leq 1,500$, $A/(B^2+C^2) \leq 1,000$, $A/(B^2+C^2) \leq 800$, or $A/(B^2+C^2) \leq 500$.

The lower limit of Relation (1) is not particularly defined, but according to an example, it may be more than 0. According to the example, Relation (1) may be $0 < A/(B^2+C^2) \leq 4500$.

Relation (2) is for defining the specific doping content of iron, and Relation (3) is for defining the specific doping content of aluminum. When iron and aluminum are doped below the lower limit of Relation (2) or (3), the doping content is so small that sufficient life characteristics and thermal stability may not be secured. When iron and aluminum are doped above the upper limit of Relation (2) or (3), each of the doping contents is so large that a migration path of lithium ions is limited, thereby deteriorating the life characteristics.

Considering the above, from the point of view of further improving the life characteristics and the thermal stability, according to an embodiment, B may be 5 or more, 7 or more and 1,500 or less, 1,300 or less, 1,000 or less, or between the numerical values. In an embodiment, B may be 7 or more and 1500 or less.

Considering the above, from the point of view of further improving the life characteristics and the thermal stability, according to an embodiment, C may be 2.5 or more, 3 or more and 1,000 or less, 900 or less, 850 or less, 800 or less, or between the numerical values. In an embodiment, C may be 3 or more and 1000 or less.

According to an embodiment of the present invention, by satisfying Relations (1) to (3), the thermal stability of a material may be improved by aluminum doping to improve a capacity retention rate at a high temperature, the kinetic properties of lithium ions may be improved by iron doping, and structural defects of a silicon-based negative electrode material may be compensated and a uniform voltage distribution on the surface of a negative electrode material may be secured by co-doping iron and aluminum. Thus, according to the present invention, significantly improved life characteristics and thermal stability of a battery may be secured.

According to an embodiment of the present invention, pre-lithiation may be performed for improving the initial efficiency (ICE) and the life characteristics of a battery to prepare a silicon-based negative electrode active material. However, the silicon-based negative electrode active material may be prepared without performing the pre-lithiation treatment. In an embodiment of not performing the pre-lithiation treatment, in the ICP analysis of the negative electrode active material layer, the lithium content A in the negative electrode active material layer may satisfy $1,000 \leq A \leq 150,000$, $2,000 \leq A \leq 150,000$, or $3,000 \leq A \leq 150,000$. In order to improve the initial efficiency and the life characteristics, in an embodiment of performing the pre-lithiation treatment, the lithium content A in the negative electrode active material layer may satisfy $5,000 \leq A \leq 150,000$, $10,000 \leq A \leq 150,000$, or $20,000 \leq A \leq 150,000$.

When Relations (1) to (3) are satisfied, the life characteristics and the thermal stability of a battery may be sufficiently improved, but according to an embodiment of the present invention, in the ICP analysis of the negative electrode active material layer, when the contents of elements in the negative electrode active material layer further satisfy the following Relation (4), the life characteristics of a battery may be further improved:

$$100 \leq B+C \quad (4)$$

wherein B is an Fe content in ppm, and C is an Al content in ppm, based on the total weight of the ICP-analyzed negative electrode active material layer.

Hereinafter, the reason for defining Relation (4) will be described.

Relation (4) is a parameter for securing an effect of further improving the life characteristics by iron and aluminum co-doping. According to an embodiment, when Relation (4) is further satisfied in addition to Relations (1) to (3), the life characteristics are further improved by the co-doping of iron and aluminum, which is thus preferred.

From the above point of view, in an embodiment, B+C may be, 100 or more, 200 or more, 300 or more, 400 or more, 500 or more and 5000 or less, 4000 or less, 3000 or less, or between these numerical values. In an embodiment, B+C may be 200 or more.

According to an embodiment of the present invention, the silicon-based negative electrode active material may include iron and aluminum.

In addition, according to an embodiment of the present invention, the silicon-based negative electrode active material may include one of Si, $SiO_x$ ($0<x \leq 2$), a Si-containing alloy, and Si/C composite, or a combination thereof. The Si-containing alloy may be, for example, a Si-Q alloy. Q is an element selected from the group consisting of alkali metals, alkaline earth metals, group 13 elements, group 14 elements other than Si, group 15 elements, group 16 elements, transition metals, rare earth elements, and combinations thereof. The element Q may be, for example, selected from the group consisting of Li, Mg, Na, K, Ca, Sr, Ba, Ra, Sc, Y, Ti, Zr, Hf, Rf, V, Nb, Ta, db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po, and combinations thereof.

According to an embodiment, since the silicon oxide ($SiO_x$) (0<x≤2) has a lower volume expansion rate than Si, the silicon-based negative electrode active material may include $SiO_x$ (0<x≤2), or at least one of Si, a Si-containing alloy, and a Si/C composite, and ($SiO_x$) (0<x≤2).

In addition, the negative electrode for a lithium secondary battery according to an embodiment of the present invention may be subjected to a pre-lithiation process from the point of view of further improving initial efficiency and life characteristics, and the negative electrode active material may further include lithium. Lithium may be doped into or chemically bonded to the silicon-based negative electrode active material.

In addition, according to an embodiment of the present invention, the silicon-based negative electrode active material includes $SiO_x$ (0<x≤2), and when the pre-lithiation process is performed, the silicon-based negative electrode active material may include a lithium silicate represented by the following Chemical Formula 1:

$$Li_xSi_yO_z$$ [Chemical Formula 1]

wherein 1≤x≤6, 1≤y≤4, 0<z≤7.

The negative electrode for a lithium secondary battery according to an embodiment of the present invention includes a current collector, and a negative electrode active material layer which is prepared on the current collector and includes the negative electrode active material and a binder.

According to an embodiment of the present invention, the current collector may be selected from the group consisting of a copper foil, a nickel foil, a stainless steel foil, a titanium foil, a nickel foam, a copper foam, a polymer substrate coated with a conductive metal and a combination thereof. However, the current collector may not be limited thereto. According to an embodiment of the present invention, the negative electrode active material may further include a material capable of reversibly inserting/desorbing a lithium ion, a lithium metal, an alloy of lithium metal, a material capable of being doped and dedoped with lithium, or a transition metal oxide.

An example of a material capable of reversibly inserting/desorbing a lithium ion may include a carbon material, that is, a carbon-based negative electrode active material which is commonly used in the lithium secondary battery. An example of a carbon-based negative electrode active material may include crystalline carbon, amorphous carbon, or a combination thereof. A crystalline carbon may include, for example, graphite such as amorphous, plate-like, flake-like, spherical, or fibrous natural graphite or artificial graphite. An example of amorphous carbon may include soft carbon, hard carbon, a mesophase pitch carbide, calcined coke, and the like.

The alloy of lithium metal may be, for example, an alloy including one or two or more selected from the group consisting of Na, K, Rb, Cs, Fr, Be, Mg, Ca, Sr, Si, Sb, Pb, In, Zn, Ba, Ra, Ge, Al, and Sn.

A material capable of being doped and dedoped with lithium may include, for example, Sn, $SnO_2$, Sn—R alloy (wherein R is an element selected from the group consisting of alkali metals, alkali earth metals, Group 13 elements, Group 14 elements, Group 15 elements, Group 16 elements, transition metals, rare earth elements, and a combination thereof, but is not Sn), a Sn-carbon composite, and the like, and also, a mixture of at least one of them and $SiO_2$. The elements Q and R may be, for example, one or two or more selected from the group consisting of Na, K, Mg, Ca, Sr, Ba, Ra, Sc, Y, Ti, Zr, Hf, Rf, V, Nb, Ta, db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po, and combinations thereof.

The transition metal oxide may be, for example, a lithium titanium oxide.

According to an embodiment of the present invention, the binder serves to adhere the negative electrode active material particles to each other, and also serves to adhere the negative electrode active material to a current collector. Any suitable binder may be used including, for example, a water-based binder. Examples of a water-based binder include polyvinylidene fluoride (PVDF), polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene polymer (EPDP), sulfonated-EPDM, styrene-butadiene rubber (SBR), fluorine rubber, various copolymers thereof, and the like. For example, the binder may include one of carboxyl methyl cellulose (CMC), styrene-butadiene rubber (SBR), and a mixture thereof.

The negative electrode active material layer according to an embodiment may further selectively include a conductive material. The conductive material may impart conductivity to an electrode. Any material having conductivity without causing a chemical change to a battery may be used without limitation. An example of the conductive material may include a carbon-based material such as natural graphite, artificial graphite, carbon black, acetylene black, ketjen black, carbon fiber, single-walled carbon nanotubes (SW-CNT), and multi-walled carbon nanotubes (MW-CNT); a metal-based material such as metal powder or metal fiber of copper, nickel, aluminum, silver, and the like; a conductive polymer such as a polyphenylene derivative; or a mixture thereof.

The contents of the binder and the conductive material in the negative electrode active material layer may be, for example, 0.1 to 10 wt % or 0.1 to 7 wt % based on the total weight of the negative electrode active material layer. It is noted, that the contents of the binder and the conductive material are not limited to the example described above.

In the negative electrode for a lithium secondary battery according to the present invention described above, according to an embodiment, the negative electrode active material may be prepared by stirring a negative electrode active material precursor including a silicon-based material with a solution or dispersion prepared by dissolving or dispersing an iron precursor and an aluminum precursor as a doping raw material in water or water-based solvent, or a non-water-based solvent or dispersion medium, and performing a heat treatment, but is not particularly limited thereto, and the negative electrode may be manufactured by various manufacturing methods without limitation, as long as Relations (1) to (3) are satisfied, or preferably, relation (4) is further satisfied. The water-based or non-water-based solvent or dispersion medium may be any suitable solvents and dispersion media known in the art without limitation, and are not particularly limited.

Hereinafter, the method of manufacturing a negative electrode for a lithium secondary battery according to an embodiment of the present invention will be described.

According to an embodiment of the present invention, a method of manufacturing a negative electrode for a lithium secondary battery includes: a) stirring a solution or dispersion including a silicon-based material, an iron precursor, and an aluminum precursor; and b) heat treating the resultant product of the process a), thereby preparing a negative electrode active material co-doped with iron and aluminum, may be provided.

In addition, according to an embodiment of the present invention, the silicon-based material may include one of Si, $SiO_x$ ($0<x\leq2$), a Si-containing alloy, and a Si/C composite, or a combination thereof. The Si-containing alloy may be, for example, a Si-Q alloy. Q is an element selected from the group consisting of alkali metals, alkaline earth metals, group 13 elements, group 14 elements other than Si, group 15 elements, group 16 elements, transition metals, rare earth elements, and combinations thereof. The element Q may be, for example, selected from the group consisting of Li, Mg, Na, K, Ca, Sr, Ba, Ra, Sc, Y, Ti, Zr, Hf, Rf, V, Nb, Ta, db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po, and combinations thereof.

Without particular limitation, according to an embodiment of the present invention, since $SiO_x$ ($0<x\leq2$) has a lower volume expansion rate than Si, the silicon-based material may include $SiO_x$ ($0<x\leq2$), or at least one of Si, a Si-containing alloy, and a Si/C composite, and ($SiO_x$) ($0<x\leq2$).

According to an embodiment of the present invention, in order to improve the initial capacity characteristics of the silicon-based material, the material may be prepared by a pre-lithiation treatment, and the silicon-based material in the process a) may be previously prepared by the pre-lithiation process of mixing the silicon-based material and a lithium precursor and then performing a heat treatment to dope the silicon-based material with lithium.

The pre-lithiation process may be performed by appropriately mixing a silicon-based material and a lithium precursor and then performing a heat treatment. According to an example, the silicon-based material and the lithium precursor may be mixed so that a Li/Si molar ratio is 0.3 to 1.2 or 0.4 to 1.0. The heat treatment may be performed at 500 to 1000° C. or 500 to 700° C. for 1 to 12 hours under an inert atmosphere. A lithium doping process using an electrochemical method of oxidation reduction method may be used to easily form lithium silicate. However, a production rate of a lithium silicate having a relatively significantly improved volume expansion mitigation effect among lithium silicates under the heat treatment conditions described above is higher. For example, the production rate of $Li_2SiO_3$ having a relatively significantly improved volume expansion mitigation effect among lithium silicates is higher when the heat treatment conditions described above is applied than when an electrochemical method or an oxidation reduction method is used, which is thus advantageous for improving the battery life characteristics.

The lithium precursor may include a lithium hydride (LiH), a lithium hydroxide (LiOH), a lithium oxide (LIO, a lithium carbonate ($Li_2CO3$), lithium particles, or a combination thereof.

According to an embodiment of the present invention, the silicon-based material may be doped with lithium by the pre-lithiation process described above. Thus, the silicon-based material according to an example may include lithium, for example, lithium silicate.

According to an embodiment of the present invention, a process a) of stirring a solution or dispersion including a silicon-based material, an iron precursor, and an aluminum precursor may be performed. According to an example, the solution or dispersion may be prepared by dispersing or dissolving an iron precursor or an aluminum precursor as a doping raw material into a water-based or non-water-based solvent or a dispersion medium. The silicon-based material may be prelithiated or not be prelithiated, if necessary. The water-based or non-water-based solvent or dispersion medium may be all materials known in the art, and is not particularly limited.

According to an embodiment of the present invention, the iron precursor may include one of an Fe metal; an Fe oxide; an Fe compound or Fe oxide containing one or more of Cl, N, P, and H; and an Fe composite oxide containing one or more metals of Li, Ti, V, Cr, Mn, Co, and Ni; or a combination thereof. The iron precursor may be, for example, Fe, FeO, $Fe_2O_3$, $Fe_3O_4$, $FeCl_2$, $FeCl_3$, $FeBr_2$, $FeBr_3$, $Fe(NO_3)_2$, $FeSO_4$, $Fe(CH_3COO)_2$, $Fe(CH_3COO)_3$, $Fe(OH)_3$, $Fe(OH)_2$, FeOOH, $Fe_5HO_8 \cdot 4H_2O$, $Fe(NO_3)_3 \cdot 9H_2O$, or $C_{12}H_{26}FeO_{16}$, but is not particularly limited thereto.

According to an embodiment of the present invention, the aluminum precursor may include one of an Al metal; an Al oxide; an Al compound or Al oxide containing one or more of Cl, N, P, and H; and an Al composite oxide containing one or more metals of Li, Ti, V, Cr, Mn, Co, and Ni; or a combination thereof. The aluminum precursor may be, for example, Al, $Al_2O_3$, $AlCl_3$, $AlBr_3$, $Al(NO_3)_2$, $Al_2(SO_4)_3$, $Al(CH_3COO)_3$, $Al(OH)_3$, $Al(H_2PO4)_3$, $AlPO_4$, $Al_2S_2O_5$, or $Al(NO_3)_3 \cdot 9H_2O$, but is not particularly limited.

Though is not particularly limited thereto, according to an embodiment of the present invention, the process a) may be the stirring of the doped silicon-based material; and a solution or dispersion including the iron precursor and the aluminum precursor so that an Fe/Si molar ratio and an Al/Si molar ratio are in an appropriate range, thereby achieving the effect of the compensation of the structural defect of the silicon-based negative electrode material and securing of a uniform current distribution on the surface of the negative electrode material by co-doping of iron and aluminum.

In an embodiment, the Fe/Si molar ratio may be more than 0, 0.00005 or more, 0.0001 or more and 0.07 or less, 0.05 or less, 0.03 or less, 0.02 or less, or between the numerical values, and in a specific embodiment, the Fe/Si molar ratio may be more than 0 and 0.07 or less, 0.00005 or more and 0.05 or less, and 0.0001 or more and 0.03 or less.

In an embodiment, the Al/Si molar ratio may be more than 0, 0.00005 or more, 0.0001 or more and 0.08 or less, 0.07 or less, 0.06 or less, 0.05 or less, 0.04 or less, 0.03 or less or between the numerical values, and in a specific embodiment, the Al/Si molar ratio may be more than 0 and 0.08 or less, 0.00005 or more and 0.06 or less, and 0.0001 or more and 0.05 or less.

The solvent or the dispersion medium of the solution or the dispersion including the iron precursor or the aluminum precursor may be a water-based or non-water-based solvent or dispersion medium, and may be all materials known in the art without limitation. According to a non-limiting example, the solvent or the dispersion medium may be water, alcohol, tetrahydrofuran (THF), or dimethylformamide (DMF).

As a stirring speed, a stirring speed at which the iron precursor, the aluminum precursor, and the silicon-based material may be uniformly mixed is sufficient, and without particular limitation, for example, it may be 100 to 3000 rpm, 100 to 2000 rpm, 100 to 1000 rpm, preferably 300 to 3000 rpm, 300 to 2000 rpm, 300 to 1000 rpm, more preferably 500 to 3000 rpm, 500 to 2000 rpm, or 500 to 1000 rpm. A stirring time at this time is not particularly limited, but for example, may be 1 minute to 3 hours or 10 minutes to 3 hours.

As a temperature during the stirring, a temperature at which the iron precursor, the aluminum precursor, and the silicon-based material are uniformly mixed is sufficient, and without particular limitation, it may be for example, 15 to 80° C., 15 to 70° C., or 15 to 65° C.

According to an embodiment of the present invention, the heat treatment of process b) may be performed in a temperature range of 200 to 1000° C., 200 to 600° C., 300 to 1000° C., 300 to 600° C., and 300 to 500° C. for 1 hour to 12 hours, under an inert atmosphere. In addition, the heat treatment may be performed under an inert atmosphere or a reducing atmosphere, and according to a non-limiting example, it may be performed under an inert atmosphere including one or more $N_2$, Ar, and Ne, or under a reducing atmosphere including $H_2$.

According to an embodiment of the present invention, the pre-lithiation processes of doping lithium and of doping iron and aluminum may be performed in combination. According to an embodiment, the process described above may be performed by further including a lithium precursor and stirring it with the silicon-based material, the iron precursor, and the aluminum precursor, in which the lithium precursor may be simultaneously or sequentially mixed with the silicon-based material, the iron precursor, and the aluminum precursor, and then the process may be performed.

According to another embodiment of the present invention in the case of performing the pre-lithiation process and the process of doping iron and aluminum in combination, a) stirring a solution or dispersion including a silicon-based material, a lithium precursor, an iron precursor, and an aluminum precursor; and b) heat treating the product of the process a) may be included to prepare a negative electrode active material which is co-doped with iron and aluminum.

Since each constituent of the solution or dispersion including the silicon-based material, the lithium precursor, and the iron precursor and the aluminum precursor or the iron precursor or the aluminum precursor is as described above, the description thereof will be omitted for convenience.

After performing the co-doping of iron and aluminum described above, according to an embodiment of the present invention, the resulting product of a co-doping process, a water-based binder, a conductive material, and the like are mixed to prepare a negative electrode slurry, and then the prepared negative electrode slurry is applied on a current collector, dried, and rolled to manufacture a negative electrode in which the negative electrode layer is prepared on the current collector.

According to an embodiment of the present invention, a lithium secondary battery including the negative electrode described above, a positive electrode, a separator provided between the negative electrode and the positive electrode, and an electrolyte solution may be provided.

The positive electrode may include, for example, a current collector and a positive electrode active material layer formed by applying a positive electrode slurry including a positive electrode active material on the current collector.

The current collector may be the negative electrode current collector described above, and any known material in the art may be used, but the present invention may not be limited thereto.

The positive electrode active material layer includes a positive electrode active material, and optionally, may further include a binder and a conductive material. The positive electrode active material may be any positive electrode active material known in the art, and may be, for example, a composite oxide of a metal selected from cobalt, manganese, nickel, and a combination thereof with lithium. However, the positive electrode active material may not be limited thereto.

The binder and the conductive material may be, for example, the negative electrode binder described above and the negative electrode conductive material, and may be a material known in the art. However, the binder and the conductive material are not limited to the example described above.

The separator may include, for example, glass fiber, polyester, polyethylene, polypropylene, polytetrafluoroethylene, or a combination thereof, and may be in the form of nonwoven or woven fabric. The separator may be a polyolefin-based polymer separator such as polyethylene and polypropylene, a separator coated with a composition including a ceramic component or a polymer material for securing heat resistance or mechanical strength, or a separator known in the art. The separator may have, for example, optionally a monolayer or multilayer structure. However, the material and the shape of the separator are not limited to the examples.

The electrolyte solution may include an organic solvent and a lithium salt.

The organic solvent may serve as a medium in which ions involved in the electrochemical reaction of a battery may move. The organic solvent may be, for example, a carbonate-based, ester-based, ether-based, ketone-based, alcohol-based, or aprotic solvent alone or a combination of two or more, and when it is used in combination of two or more, a mixing ratio may be properly adjusted depending on the battery performance to be desired. However, a non-limiting example of the organic solvent may include ethylene carbonate (EC) and ethylmethyl carbonate (EMC), but the organic solvent may not be limited to the examples described above.

The lithium salt is dissolved in the organic solvent and may act as a source of lithium ions in the battery to allow basic operation of the lithium secondary battery, and promote movement of lithium ions between a positive electrode and a negative electrode. The lithium salt may include, for example, $LiPF_6$, $LiBF_4$, $LiSbF_6$, $LiAsF_6$, $LiN(SO_3C_2F_5)_2$, $LiN(CF_3SO_2)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (x and y are natural numbers), LiCl, LiI, $LiB(C_2O_4)_2$, or a combination thereof. However, the lithium salt may not be limited to the examples described above.

A concentration of the lithium salt may be, for example, 0.1 to 2.0 M. When the lithium salt concentration is within the 0.1 to 2.0 M range, the electrolyte solution has appropriate conductivity and viscosity, and thus, significantly improved electrolyte solution performance may be shown.

The electrolyte solution according to an embodiment may further include pyridine, triethylphosphate, triethanolamine, cyclic ether, ethylene diamine, n-glyme, hexaphosphate triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxyethanol, aluminum trichloride, and the like, if necessary, for improving charge and discharge characteristics, flame retardant characteristics, and the like. For example, the electrolyte solution may further include a halogen-containing solvent such as carbon tetrachloride and ethylene trifluoride for imparting incombustibility. For example, the electrolyte solution may further include fluoroethylene carbonate (FEC), propene sulfone (PRS), fluoropropylene carbonate (FPC), and the like for improving preservation properties at a high temperature.

The lithium secondary battery according to an embodiment of the present invention may be manufactured by laminating the negative electrode, the separator, and the positive electrode in this order to form an electrode assembly, placing the manufactured electrode assembly in a cylindrical battery case or an angled battery case, and then injecting an electrolyte solution. The lithium secondary battery according to another exemplary embodiment may be manufactured by laminating the electrode assembly, immersing the assembly in the electrolyte solution, placing the resultant product in a battery case in a pouch form, and sealing the case. However, the method of manufacturing a lithium secondary battery may not be limited to the examples described above.

As the battery case, those commonly used in the art may be adopted, there is no limitation in appearance depending on the battery use, and for example, a cylindrical shape, an angled shape, a pouch shape, a coin shape, or the like using a can may be used.

The lithium secondary battery according to the present invention may be used in a battery cell used as a power supply of a small device, and also may be used as a battery cell in a medium or large battery module including a plurality of battery cells. An example of the medium or large battery module may include an electric automobile, a hybrid electric automobile, a plug-in hybrid electric automobile, a system for power storage, and the like. However, the use of the lithium secondary battery may not be limited to the examples described above.

Hereinafter, the examples and the comparative examples of the present invention will be described. However, the present disclosure may not be limited thereto.

EXAMPLES

Example 1

Silicon-Based Material

A negative electrode active material was manufactured using a silicon-based material including one of Si, $SiO_x$ (0<x≤2), a Si-containing alloy, and a Si/C composite, or a combination thereof. The silicon-based material had an average particle diameter (D50) of about 8.0 μm.

Pre-Lithiation Process

The silicon-based material and LiH powder were mixed so that a Li/Si molar ratio was 0.3 to 1.2, thereby forming mixed powder, which was heat-treated at 700° C. for 4 to 10 hours in a nitrogen gas atmosphere. Subsequently, the heat-treated powder was recovered and pulverized in a mortar, thereby doping the silicon-based material with lithium.

Iron and Aluminum Co-Doping Process

An aqueous dispersion in which a silicon-based material doped with lithium, an iron precursor ($Fe(NO_3)_3 \cdot 9H_2O$), and an aluminum precursor ($Al(NO_3)_3 \cdot 9H_2O$) were dispersed so that an Fe/Si molar ratio was 0.00011 and an Al/Si molar ratio was 0.00012 was stirred at 300 to 1000 rpm at 20 to 60° C. for 30 minutes to 2 hours. The resultant product from the stirring was filtered and dried, heat-treated at 300 to 500° C. for a period of 30 minutes to 2 hours under an Ar inert atmosphere, and then recovered.

Manufacture of Negative Electrode

An amount of 5 to 30 wt % of the resultant product (negative electrode active material) from the previous process, 66 to 92 wt % of artificial graphite, 0.05 to 0.3 wt % of single wall-CNT (SW-CNT), 1.0 to 2.0 wt % of a carboxylmethyl cellulose (CMC) binder, 1.0 to 3.0 wt % of a styrene-butadiene rubber (SBR) binder were mixed in distilled water to prepare a negative electrode slurry. The negative electrode slurry was applied on a Cu foil current collector, dried, and rolled to manufacture a negative electrode having a negative electrode active material layer prepared on the current collector by a common process.

Manufacture of Half Battery

The negative electrode manufactured, a lithium metal as a counter electrode, and a PE separator between the negative electrode and the counter electrode were disposed, and an electrolyte solution was injected to manufacture a CR2016 type coin cell. The assembled coin cell was paused at room temperature for 3 to 24 hours to manufacture a half battery. At this time, the electrolyte solution was obtained by mixing 1.0 M $LiPF_6$ as a lithium salt with an organic solvent (EC:EMC=30:70 vol %) and mixing 2 to 5 vol % of FEC 2 as an electrolyte additive.

Example 2

In Example 2, a negative electrode and a half battery were manufactured under the same conditions as Example 1, except that the iron and aluminum co-doping process was performed under the following conditions:

An aqueous dispersion in which a silicon-based material doped with lithium, an iron precursor ($Fe(NO_3)_3 \cdot 9H_2O$), and an aluminum precursor ($Al(NO_3)_3 \cdot 9H_2O$) were dispersed so that an Fe/Si molar ratio was 0.00055 and an Al/Si molar ratio was 0.00063 was stirred at 300 to 1000 rpm at 20 to 60° C. for 30 minutes to 2 hours. The resultant product from the stirring was filtered and dried, heat-treated at 300 to 500° C. for 30 minutes to 2 hours under an Ar inert atmosphere, and then recovered.

Example 3

In Example 3, a negative electrode and a half battery were manufactured under the same conditions as Example 1, except that the iron and aluminum co-doping process was performed under the following conditions:

An aqueous dispersion in which a silicon-based material doped with lithium, an iron precursor ($Fe(NO_3)_3 \cdot 9H_2O$), and an aluminum precursor ($Al(NO_3)_3 \cdot 9H_2O$) were dispersed so that an Fe/Si molar ratio was 0.00022 and an Al/Si molar ratio was 0.00235 was stirred at 300 to 1000 rpm at 20 to 60° C. for 30 minutes to 2 hours. The resultant product from the stirring was filtered and dried, heat-treated at 300 to 500° C. for 30 minutes to 2 hours under an Ar inert atmosphere, and then recovered.

Example 4

In Example 4, a negative electrode and a half battery were manufactured under the same conditions as Example 1, except that the iron and aluminum co-doping process was performed under the following conditions:

An aqueous dispersion in which a silicon-based material doped with lithium, an iron precursor ($Fe(NO_3)_3 \cdot 9H_2O$), and an aluminum precursor ($Al(NO_3)_3 \cdot 9H_2O$) were dispersed so that an Fe/Si molar ratio was 0.00164 and an Al/Si molar ratio was 0.00024 was stirred at 300 to 1000 rpm at 20 to 60° C. for 30 minutes to 2 hours. The resultant product from the stirring was filtered and dried, heat-treated at 300 to 500° C. for 30 minutes to 2 hours under an Ar inert atmosphere, and then recovered.

Example 5

In Example 5, a negative electrode and a half battery were manufactured under the same conditions as Example 1, except that the iron and aluminum co-doping process was performed under the following conditions:

An aqueous dispersion in which a silicon-based material doped with lithium, an iron precursor ($Fe(NO_3)_3 \cdot 9H_2O$), and an aluminum precursor ($Al(NO_3)_3 \cdot 9H_2O$) were dispersed so that an Fe/Si molar ratio was 0.00437 and an Al/Si molar ratio was 0.00470 was stirred at 300 to 1000 rpm at 20 to 60° C. for 30 minutes to 2 hours. The resultant product from the stirring was filtered and dried, heat-treated at 300 to 500° C. for 30 minutes to 2 hours under an Ar inert atmosphere, and then recovered.

Example 6

In Example 6, a negative electrode and a half battery were manufactured under the same conditions as Example 1, except that the iron and aluminum co-doping process was performed under the following conditions:

An aqueous dispersion in which a silicon-based material doped with lithium, an iron precursor ($Fe(NO_3)_3 \cdot 9H_2O$), and an aluminum precursor ($Al(NO_3)_3 \cdot 9H_2O$) were dispersed so that an Fe/Si molar ratio was 0.01092 and an Al/Si molar ratio was 0.02939 was stirred at 300 to 1000 rpm at 20 to 60° C. for 30 minutes to 2 hours. The resultant product from the stirring was filtered and dried, heat-treated at 300 to 500° C. for 30 minutes to 2 hours under an Ar inert atmosphere, and then recovered.

Example 7

In Example 7, a negative electrode and a half battery were manufactured under the same conditions as Example 1, except that the iron and aluminum co-doping process was performed under the following conditions:

An aqueous dispersion in which a silicon-based material doped with lithium, an iron precursor ($Fe(NO_3)_3 \cdot 9H_2O$), and an aluminum precursor ($Al(NO_3)_3 \cdot 9H_2O$) were dispersed so that an Fe/Si molar ratio was 0.01310 and an Al/Si molar ratio was 0.01411 was stirred at 300 to 1000 rpm at 20 to 60° C. for 30 minutes to 2 hours. The resultant product from the stirring was filtered and dried, heat-treated at 300 to 500° C. for 30 minutes to 2 hours under an Ar inert atmosphere, and then recovered.

Example 8

In Example 8, a negative electrode and a half battery were manufactured under the same conditions as Example 1, except that the iron and aluminum co-doping process was performed under the following conditions, without performing a pre-lithiation process:

An aqueous dispersion in which a silicon-based material, an iron precursor ($Fe(NO_3)_3 \cdot 9H_2O$), and an aluminum precursor ($Al(NO_3)_3 \cdot 9H_2O$) were dispersed so that an Fe/Si molar ratio was 0.00437 and an Al/Si molar ratio was 0.01176 was stirred at 300 to 1000 rpm at 20 to 60° C. for 30 minutes to 2 hours. The resultant product from the stirring was filtered and dried, heat-treated at 300 to 500° C. for 30 minutes to 2 hours under an Ar inert atmosphere, and then recovered.

Comparative Example 1

The manufacture was performed under the same conditions as in Example 1, except that the pre-lithiation process and the iron and aluminum co-doping process were not performed.

Comparative Example 2

The manufacture was performed under the same conditions as in Example 1, except that the pre-lithiation process was performed (under the same conditions as in Example 1) and the iron and aluminum co-doping process was not performed.

Comparative Example 3

In Comparative Example 3, a negative electrode and a half battery were manufactured under the same conditions as Example 1, except that aluminum was not doped and iron was doped under the following conditions:

An aqueous dispersion in which a lithium-doped silicon-based material and an iron precursor ($Fe(NO_3)_3 \cdot 9H_2O$) were dispersed so that an Fe/Si molar ratio was 0.00819, was stirred at 300 to 1000 rpm at 20 to 60° C. for 30 minutes to 2 hours. The resultant product from the stirring was filtered and dried, heat-treated at 300 to 500° C. for 30 minutes to 2 hours under an Ar inert atmosphere, and then recovered.

Comparative Example 4

In Comparative Example 4, a negative electrode and a half battery were manufactured under the same conditions as in Example 1, except that iron was not doped and aluminum was doped under the following conditions:

An aqueous dispersion in which a lithium-doped silicon-based material and an alumina precursor ($Al(NO_3)_3 \cdot 9H_2O$) were dispersed so that an Al/Si molar ratio was 0.01764 was stirred at 300 to 1000 rpm at 20 to 60° C. for 30 minutes to 2 hours. The resultant product from the stirring was filtered and dried, heat-treated at 300 to 500° C. for 30 minutes to 2 hours under an Ar inert atmosphere, and then recovered.

Comparative Example 5

A negative electrode and a half battery were manufactured under the same conditions as Example 1, except that the iron and aluminum co-doping process was performed so that they are excessively doped under the following conditions:

An aqueous dispersion in which a silicon-based material doped with lithium, an iron precursor ($Fe(NO_3)_3 \cdot 9H_2O$), and an aluminum precursor ($Al(NO_3)_3 \cdot 9H_2O$) were dispersed so that an Fe/Si molar ratio was 0.07641 and an Al/Si molar ratio was 0.08230 was stirred at 300 to 1000 rpm at 20 to 60° C. for 30 minutes to 2 hours. The resultant product from the stirring was filtered and dried, heat-treated at 300 to 500° C. for 30 minutes to 2 hours under an Ar inert atmosphere, and then recovered.

In order to analyze the battery properties of each of the examples and the comparative examples, ICP analysis of the negative electrode active material layer was performed, a life retention rate (%) and a high temperature capacity retention rate (%) were measured, and the results are shown in the following Table 1.

The ICP analysis of the negative electrode active material layer in Table 1 was performed as follows. The half battery manufactured in each of the examples and the comparative examples was charged at a constant current until the voltage reached 0.01 V (vs. Li/Li⁺) at a current of 0.1 C rate, and then was charged with a constant voltage by cut-off at a current of 0.01 C rate while maintaining 0.01 V in a constant voltage mode. The battery was discharged at a constant current of 0.1 C rate until the voltage reached 1.5 V (vs. Li/Li⁺). One charge and discharge cycle was performed under the charge and discharge conditions, and then disassembly was performed to obtain a negative electrode. Next, the disassembled negative electrode was washed with an organic solvent such as dimethyl carbonate (DMC) several times, and negative electrode active material layer powder was recovered by scrapping off the powder so that a current collector was not included.

A method of measuring the Li content (A), the Fe content (B), and the Al content (C) using the negative electrode active material layer powder recovered above was as follows:

[1] adding 0.01 to 0.05 g of the recovered negative electrode active material layer powder to a 50 mL PP tube;
[2] adding a nitric acid to the PP tube and then adding a hydrofluoric acid thereto until brown fume does not occur;
[3] heating the PP tube with a heating block and drying the tube to remove a hydrofluoric component;
[4] adding a nitric acid and hydrogen peroxide to the PP tube and then heating the PP tube with a heating block for redissolving;
[5] cooling the resulting product to room temperature, diluting it with ultrapure water, and filtering it for removing insoluble components to prepare a sample; and
[6] performing ICP analysis on the prepared sample to measure the Li content (A), the Fe content (B), and the Al content (C) (A, B, and C are the weights (ppm) of Li, Fe, and Al included based on the total weight of the negative electrode active material layer (powder) to be measured, respectively).

ICP analysis was performed using Optima 8300DV available from Perkin Elmer. The ICP analysis results were derived as weight ratios (ppm) of Li, Fe, and Al in the negative electrode active material layer, based on the total weight of the ICP-analyzed negative electrode active material layer, and are shown in Table 1.

The sum of Fe content (B) (ppm) and the Al content (C) (ppm) derived is indicated as "B+C" and is shown in Table 1 together.

A value derived by substituting the Li content (A) (ppm), the Fe content (B) (ppm), and the Al content (C) (ppm) into "A/(B²+C²)" of the following Relation (1) is shown in Table 1 together.

$$A/(B^2+C^2) \leq 4{,}500 \quad (1)$$

wherein A is a Li content in ppm, B is an Fe content in ppm, and C is an Al content in ppm.

The "life retention rate (%)" in Table 1 was measured as follows. The half battery manufactured in each of the examples and the comparative examples was charged at a constant current at room temperature (25° C.) until the voltage reached 0.01 V (vs. Li/Li⁺) at a current of 0.1 C rate, and then was charged with a constant voltage by cut-off at a current of 0.01 C rate while maintaining 0.01 V in a constant voltage mode. The battery was discharged at a constant current of 0.1 C rate until the voltage reached 1.5 V (vs. Li/Li⁺). The charge and discharge were set as one cycle, one more cycle of charge and discharge was performed under the same conditions, charge and discharge were performed with the applied current being changed to 0.5 C during charge, and a pause of 10 minutes was put between the cycles. A percentage of the discharge capacity after 200 cycles to the discharge capacity after one cycle of charge and discharge is indicated as "life retention rate (%)" in Table 1.

The "high temperature capacity retention rate (%)" in Table 1 was derived as a percentage of a discharge capacity (comparison) obtained by charging a half battery once, allowing it to stand in a high temperature atmosphere of 45° C. for 8 weeks or more, and then charging again and discharging it to an initial discharge capacity (reference). At this time, the charging and discharging conditions were the same as those when measuring the life retention rate (%).

(Initial discharge capacity(reference)(25° C.)–charge (25° C.)–standing at high temperature(45° C.)–discharge(25° C.)–charge(25° C.)–discharge capacity(comparison)(25° C.))

TABLE 1

|  | ICP analysis results of negative electrode active material layer | | | | | Life retention rate (%) | High temperature capacity retention rate (%) |
| --- | --- | --- | --- | --- | --- | --- | --- |
|  | Li (A) (ppm) | Fe (B) (ppm) | Al (C) (ppm) | B + C | A/(B² + C²) | | |
| Example 1 | 30,000 | 8 | 3 | 11 | 410.96 | 79.8 | 81.1 |
| Example 2 | 40,000 | 40 | 16 | 56 | 21.55 | 80.2 | 83 |
| Example 3 | 30,000 | 15 | 54 | 69 | 9.55 | 81 | 83.9 |
| Example 4 | 50,000 | 110 | 6 | 116 | 4.12 | 84.1 | 82.8 |
| Example 5 | 60,000 | 300 | 102 | 402 | 0.60 | 89.5 | 84.3 |
| Example 6 | 90,000 | 950 | 790 | 1740 | 0.06 | 87.6 | 82.4 |
| Example 7 | 120,000 | 940 | 455 | 1395 | 0.11 | 85 | 82.1 |
| Example 8 | 4000 | 320 | 280 | 600 | 0.02 | 76.5 | 82.4 |
| Comparative Example 1 | 3000 | 3 | 1 | 4 | 300.00 | 68.1 | 74.2 |
| Comparative Example 2 | 60,000 | 3 | 2 | 5 | 4615.38 | 79.6 | 78.4 |
| Comparative Example 3 | 40,000 | 540 | 0.4 | 540.4 | 0.14 | 80.5 | 71.2 |
| Comparative Example 4 | 40,000 | 2 | 480 | 482 | 0.17 | 78.5 | 74.1 |
| Comparative Example 5 | 60,000 | 1560 | 1030 | 2590 | 0.02 | 75.5 | 81 |

Each of the examples and the comparative examples was evaluated referring to Table 1.

Referring to Table 1, Examples 1 to 8 satisfying an embodiment of the present invention satisfied the following Relations (1) to (3) in the ICP analysis of the negative electrode active material layer defined in the present invention, and as a result, satisfied a life retention rate of 75% or more and a high temperature capacity retention rate of 80% or more to secure significantly improved life characteristics.

$$A/(B^2+C^2) \leq 4500 \quad (1)$$

$$5 \leq B \leq 1500 \quad (2)$$

$$2.5 \leq C \leq 1000 \quad (3)$$

wherein A is a Li content in ppm, B is an Fe content in ppm, and C is an Al content in ppm, based on the total weight of the ICP-analyzed negative electrode active material layer.

Example 8 in which the pre-lithiation was not performed satisfied Relations (1) to (3), and as a result, had a relatively low life retention rate as compared with Examples 1 to 7 in which the pre-lithiation was performed, but the high temperature capacity retention rate of 80% of more was satisfied to secure thermal stability at a similar level to Examples 1 to 7.

In addition, it was confirmed that Examples 4 to 8 having a B+C value of 100 or more had a more improved life retention rate as compared with Examples 1 to 3.

Comparative Example 1 in which the pre-lithiation process and the iron and aluminum doping process were not performed included a trace amount of iron and aluminum at an impurity level, and had poor life retention rate and high temperature capacity retention rate.

Comparative Example 2 in which the pre-lithiation process was performed, but the iron and aluminum doping process was not performed included a trace amount of iron and aluminum at an impurity level, and had relatively good life retention rate as compared with Comparative Example 1, but had poor high temperature capacity retention rate.

Comparative Example 3 (doped with only iron) and Comparative Example 4 (doped with only aluminum) were not co-doped with iron and aluminum, and thus, had a poor life retention rate as compared with the examples, and had a poor high temperature capacity retention rate.

Comparative Example 5 (doped with an excessive amount of iron and aluminum) had a stabilized surface and satisfied a high temperature capacity retention rate of 80% or more, thereby securing thermal stability at a similar level to the examples. However, as a result of being doped with excessive amounts of iron and aluminum, a lithium ion migration path was limited and the life retention rate was rather deteriorated.

In the negative electrode for a lithium secondary battery according to an embodiment of the present invention, in ICP analysis of the negative electrode active material layer, contents of elements in the negative electrode active material layer may satisfy the following Relations (1) to (3), thereby improving life characteristics and thermal stability of the battery:

$$A/(B^2+C^2) \leq 4,500 \quad (1)$$

$$5 \leq B \leq 1,500 \quad (2)$$

$$2.5 \leq C \leq 1,000 \quad (3)$$

wherein A is a Li content in ppm, B is an Fe content in ppm, and C is an Al content in ppm, based on the total weight of the ICP-analyzed negative electrode active material layer.

According to the present invention, the thermal stability of a material may be improved by aluminum doping to improve a capacity retention rate at a high temperature, the kinetic properties of lithium ions may be improved by iron doping, and structural defects of a silicon-based negative electrode material may be compensated and a uniform voltage distribution on the surface of a negative electrode material may be secured by iron and aluminum co-doping. Thus, according to the present invention, significantly improved life characteristics and thermal stability of a battery may be secured.

Although the embodiments of the present invention have been described above, the present invention may not be limited to the embodiments but may be made in various forms different from each other, and those skilled in the art will understand that the present invention may be implemented in other specific forms without departing from the spirit or essential feature of the present invention. Therefore, it should be understood that the exemplary embodiments described above are not restrictive, but illustrative in all aspects.

What is claimed is:

1. A negative electrode for a lithium secondary battery comprising a silicon-based negative electrode active material including iron and aluminum,
wherein in ICP analysis of a negative electrode active material layer including the silicon-based negative electrode active material, contents of elements in the negative electrode active material layer satisfy the following Relations (1) to (3):

$$A/(B^2+C^2) \leq 4,500 \text{ ppm}^{-1}, \quad (1)$$

$$5 \text{ ppm} \leq B \leq 1,500 \text{ ppm}, \quad (2)$$

$$2.5 \text{ ppm} \leq C \leq 1,000 \text{ ppm}, \quad (3)$$

wherein A is a Li content in ppm, B is an Fe content in ppm, and C is an Al content in ppm, based on the total weight of the negative electrode active material layer,
wherein in Relation (1), 5,000 ppm≤A≤150,000 ppm is satisfied.

2. The negative electrode for a lithium secondary battery of claim 1, wherein in Relation (1), $A/(B^2+C^2) \leq 1,000$ ppm$^{-1}$ is satisfied.

3. The negative electrode for a lithium secondary battery of claim 1, wherein in the ICP analysis of the negative electrode active material layer, the contents of elements in the negative electrode active material layer further satisfy the following Relations (4):

$$100 \text{ ppm} \leq B+C \quad (4)$$

wherein B is an Fe content in ppm, and C is an Al content in ppm, based on the total weight of the negative electrode active material layer.

4. The negative electrode for a lithium secondary battery of claim 1, further comprising artificial graphite.

5. The negative electrode for a lithium secondary battery of claim 1, further comprising single-walled carbon nanotubes.

6. The negative electrode for a lithium secondary battery of claim 1, wherein the silicon-based negative electrode active material further includes lithium.

7. The negative electrode for a lithium secondary battery of claim 1, wherein the silicon-based negative electrode active material further includes a lithium silicate represented by the following Chemical Formula 1:

$Li_xSi_yO_z$ [Chemical Formula 1]

wherein $1 \leq x \leq 6$, $1 \leq y \leq 4$, and $0 < z \leq 7$.

8. A lithium secondary battery comprising the negative electrode of claim 1.

9. A negative electrode for a lithium secondary battery comprising a silicon-based negative electrode active material selected from the group consisting of Si, $SiO_x$ ($0 < x \leq 2$), a Si-containing alloy, and Si/C composite, or a combination thereof including iron and aluminum, wherein in ICP analysis of a negative electrode active material layer including the silicon-based negative electrode active material, contents of elements in the negative electrode active material layer satisfy the following Relations (1) to (3):

$A/(B^2+C^2) \leq 4{,}500$ ppm$^{-1}$, (1)

$5 \text{ ppm} \leq B \leq 1{,}500 \text{ ppm}$, (2)

$2.5 \text{ ppm} \leq C \leq 1{,}000 \text{ ppm}$, (3)

wherein A is a Li content in ppm, B is an Fe content in ppm, and C is an Al content in ppm, based on the total weight of the ICP-analyzed negative electrode active material layer, wherein in Relation (1), $5{,}000 \text{ ppm} \leq A \leq 150{,}000 \text{ ppm}$ is satisfied.

* * * * *